(12) United States Patent
Pantzar

(10) Patent No.: US 8,540,462 B2
(45) Date of Patent: Sep. 24, 2013

(54) SHIM PLATE FOR TOOLS FOR CUTTING MACHINING AS WELL AS A TOOL

(75) Inventor: Göran Pantzar, Sandviken (SE)

(73) Assignee: Sandvik Intellectual Property AB, Sandviken (SE)

( * ) Notice: Subject to any disclaimer, the term of this patent is extended or adjusted under 35 U.S.C. 154(b) by 260 days.

(21) Appl. No.: 13/163,830

(22) Filed: Jun. 20, 2011

(65) Prior Publication Data

US 2011/0311326 A1    Dec. 22, 2011

(30) Foreign Application Priority Data

Jun. 22, 2010 (SE) ...................................... 1050661

(51) Int. Cl.
*B23C 5/24* (2006.01)

(52) U.S. Cl.
USPC ................................. 407/46; 407/38; 407/44

(58) Field of Classification Search
CPC ................ B23C 5/20; B23C 5/22; B23C 5/24
USPC ........................................ 407/44–46, 36–38
See application file for complete search history.

(56) References Cited

U.S. PATENT DOCUMENTS

| 1,664,083 A | * | 3/1928 | Miller | 407/44 |
| 1,691,983 A | * | 11/1928 | Miller | 407/36 |

(Continued)

FOREIGN PATENT DOCUMENTS

| EP | 1 702 703 A1 | | 9/2006 |
| JP | 57-121412 | * | 7/1982 |

(Continued)

OTHER PUBLICATIONS

European Office Action for European Application No. 11 167 659.9, dated Nov. 16, 2011.

*Primary Examiner* — Daniel Howell
*Assistant Examiner* — Ryan Rufo
(74) *Attorney, Agent, or Firm* — Morgan, Lewis & Bockius LLP

(57) ABSTRACT

A shim plate for mounting in a cutting tool for rotary chip removing machining, the cutting tool including a basic body having a rotational axis, a peripheral envelope surface concentric with the rotational axis, a front end surface, and at least one insert seat including a seat surface, the basic body being rotatable in a direction of rotation and arranged to, in each insert seat against the seat surface, receive the shim plate and a mountable cutting insert adjacent to the shim plate. The shim plate includes a bottom surface adapted to adjoin to the seat surface of the basic body, a contact surface opposite to the bottom surface and adapted to adjoin to the cutting insert, and at least one side surface that extends between the bottom surface and the contact surface. In a radial cross-section orthogonal to the rotational axis and traversing the shim plate, an imaginary straight line (a) associated with the bottom surface, intersecting a point (a1) of the cross-section where the bottom surface is closest to the envelope surface of the basic body and a point (a2) of the cross-section where the bottom surface is closest to the rotational axis of the basic body, and an imaginary straight line (b) associated with the contact surface, intersecting a point (b1) of the cross-section where the contact surface is closest to the envelope surface of the basic body and a point (b2) of the cross-section where the contact surface is closest to the rotational axis of the basic body, diverge toward the envelope surface of the basic body and form an angle α with each other.

16 Claims, 4 Drawing Sheets

(56) References Cited

U.S. PATENT DOCUMENTS

| | | | | |
|---|---|---|---|---|
| 3,408,722 A | * | 11/1968 | Berry, Jr. | 407/46 |
| 4,202,650 A | * | 5/1980 | Erickson | 407/46 |
| 5,102,268 A | * | 4/1992 | Mitchell | 407/36 |
| 6,004,081 A | * | 12/1999 | Hellstrom et al. | 407/103 |
| 7,201,545 B2 | * | 4/2007 | Ejderklint | 409/131 |
| 7,632,046 B2 | * | 12/2009 | Andersson et al. | 407/46 |
| 2005/0047876 A1 | * | 3/2005 | Schaupp et al. | 407/36 |
| 2006/0056925 A1 | | 3/2006 | Hecht et al. | |
| 2007/0256287 A1 | * | 11/2007 | Kocherovsky et al. | 29/428 |
| 2009/0196701 A1 | * | 8/2009 | Wihlborg et al. | 408/230 |

FOREIGN PATENT DOCUMENTS

| | | | |
|---|---|---|---|
| JP | 07-237023 A | * | 9/1995 |
| JP | 2000-254813 | * | 9/2000 |
| JP | 2003-170310 A | * | 6/2003 |
| WO | 2006/130073 | | 12/2006 |

\* cited by examiner

US 8,540,462 B2

SHIM PLATE FOR TOOLS FOR CUTTING MACHINING AS WELL AS A TOOL

This application claims priority under 35 U.S.C. §119 to Swedish Patent Application No. 1050661-6, filed on Jun. 22, 2010, which is incorporated by reference herein in its entirety.

FIELD OF THE INVENTION

The present invention relates generally to a shim plate for the use in cutting tools having detachable cutting inserts intended for rotary chip removing machining of metal, such as milling tools and drilling tools. The shim plate is of the type that is placed between the bottom surface of the cutting insert and the basic body of the cutting tool in order to protect the basic body upon possible insert breakdowns. The invention also relates to a cutting tool for rotary chip removing machining, which includes one or more shim plates.

BACKGROUND OF THE INVENTION

A cutting tool for rotary chip removing machining of workpieces includes a basic body and a number of cutting inserts, as well as in some cases shim plates mounted between the cutting insert and the basic body as a protection for the basic body. The basic body is formed so that it has a center axis, i.e., a rotational axis, as well as a peripheral envelope surface, a front and a rear end surface, and a number of chip pockets, in which insert seats are arranged. Each insert seat is adapted for the mounting of a cutting insert and a shim plate. The chip pockets are adapted so that the chip release in the machining should work without problems.

Shim plates are used in cutting tools to decrease the wear of the basic body and thereby increase the service life of the basic body. In addition, the shim plate decreases the risk of serious damage to the basic body upon a possible insert breakdown. Insert breakdowns almost exclusively occur at the main edge of the cutting insert, i.e., the active cutting edge at the envelope surface of the basic body. The shim plate, placed between the cutting insert and the basic body, can then continue to remove chips from the workpiece in the period of time it takes to interrupt the progressing machining. Without a shim plate, there is risk of the basic body getting stuck in the workpiece leading to damage to the basic body, the spindle that drives the cutting tool, as well as to other co-operating parts in the machine tool in which the cutting tool is included. Therefore, it is desirable to use a shim plate. The shim plate is mounted between the basic body and the cutting insert in such a way that the bottom surface of the cutting insert rests against the shim plate, while the possible other support surfaces of the cutting insert abut against the basic body of the cutting tool. The ways to fix the shim plate in the basic body vary; for example, they can be attached together with the cutting insert by a simple screw, or a tubular screw having a threaded inside can be used to attach the shim plate, so that the cutting insert easily can be attached to the tubular screw and be replaced without the shim plate needing to be removed. Shim plates of the usual plane type intended for milling tools are, for example, disclosed in WO2006130073. The shim plate disclosed therein includes a coupling to prevent sliding in relation to the basic body.

A disadvantage of shim plates is that they decrease the strength of the basic body, since the insert seat has to be made deeper to make room for the shim plate for the size of the chip pockets not to be affected. Since the size of the chip pockets is optimized in respect of chip release, it is not desirable to decrease the same. The force that acts on the cutting tool in the machining varies, among other things depending on the cutting depth and on the type of machining and material. In milling, the force is however primarily directed so that a deepening of the insert seat to make room for a shim plate significantly affects the strength. For small cutting tools, such as shank-end mills, and for tools having many cutting inserts mounted, this becomes particularly problematic since the chip pockets proportionally already occupy a great part of the basic body. The strength of the basic body is considerably impaired by a further deepening of the insert seats and the risk will be too great that cracks, as a consequence of overloading, should arise in the basic body upon machining.

The present invention aims at increasing the service life of cutting tools for rotary chip removing machining, henceforth called cutting tools, at the same time as the strength of the basic body of the cutting tool is maintained. This applies particularly to small cutting tools, for example shank-end mills, or to cutting tools having many cutting inserts.

SUMMARY OF THE INVENTION

In an embodiment, the invention provides a shim plate for mounting in a cutting tool for rotary chip removing machining, the cutting tool including a basic body having a rotational axis, a peripheral envelope surface concentric with the rotational axis, a front end surface, and at least one insert seat including a seat surface, the basic body being rotatable in a direction of rotation and arranged to, in each insert seat against the seat surface, receive the shim plate and a mountable cutting insert adjacent to the shim plate. The shim plate includes a bottom surface adapted to adjoin to the seat surface of the basic body, a contact surface opposite to the bottom surface and adapted to adjoin to the cutting insert, and at least one side surface that extends between the bottom surface and the contact surface. In a radial cross-section orthogonal to the rotational axis and traversing the shim plate, an imaginary straight line (a) associated with the bottom surface, intersecting a point (a1) of the cross-section where the bottom surface is closest to the envelope surface of the basic body and a point (a2) of the cross-section where the bottom surface is closest to the rotational axis of the basic body, and an imaginary straight line (b) associated with the contact surface, intersecting a point (b1) of the cross-section where the contact surface is closest to the envelope surface of the basic body and a point (b2) of the cross-section where the contact surface is closest to the rotational axis of the basic body, diverge toward the envelope surface of the basic body and form an angle α with each other.

In another embodiment, the invention provides a cutting tool for rotary chip removing machining. A basic body includes a rotational axis, a peripheral envelope surface concentric with the rotational axis, and at least one insert seat having a seat surface arranged therein, the cutting tool being rotatable in a direction of rotation. A shim plate is detachably mounted to the seat surface of the insert seat. A detachably mounted cutting insert is adjacent to the shim plate in the insert seat. The shim plate includes a bottom surface adjacent to the seat surface of insert seat, a contact surface opposite to the bottom surface and adjacent to the cutting insert, and at least one side surface extending between the bottom surface and the contact surface. In a radial cross-section orthogonal to the rotational axis and traversing the shim plate, an imaginary straight line (a) associated with the seat surface of insert seat, intersecting a point (a1) of the cross-section where the seat surface is closest to the envelope surface and a point (a2) of the cross-section where the seat surface is closest to the rotational axis, and an imaginary straight line (b) associated with the contact surface of the shim plate, intersecting a point (b1) of the cross-section where the contact surface is closest to the envelope surface and a point (b2) of the cross-section where the contact surface is closest to the rotational axis, diverge toward the envelope surface and form an angle α with each other.

According to an embodiment, the shim plate is primarily made wedge-shaped in the radial direction, so that the distance between the bottom surface of the shim plate and the contact surface thereof facing the cutting insert primarily increases in the radial direction from the rotational axis of the basic body. Thereby, the shim plate is thicker at the envelope surface of the basic body than closer to the rotational axis.

An advantage of the shim plate and the cutting tool according to the invention is that the use of a shim plate is made possible also in small cutting tools, for example in shank-end mills, or in cutting tools having a large number of insert seats without the strength of the basic body being affected appreciably. Thereby, the service life of the cutting tool increases by the combined effect of the maintained strength of the basic body, decreased wear of the basic body thanks to the shim plate, and the decreased risk of serious damage to the basic body upon possible insert breakdowns.

According to a preferred embodiment, the angle α is 5-30°, more preferably 10-25°. The advantage of this embodiment is that the difference in the thickness between the inner and outer parts of the shim plate then will be sufficiently great in order for the strength of the basic body to be maintainable at the same time as the shim plate provides a protecting effect at the envelope surface. Simultaneously, the ability of the shim plate to be held in place during machining is not compromised.

According to another embodiment, the bottom surface of the shim plate and the adjacent seat surface of the basic body include coupling means, for example in the form of serration surfaces or other connecting surfaces including male members intended to engage female members. The advantage of this embodiment is that the shim plate is fixed in its position in relation to the basic body and prevented from changing position in relation to the same.

According to an additional embodiment, the shim plate is wedge-shaped also in the axial direction, preferably in such a way that the thickness of the shim plate increases toward the front end surface. The advantage of this embodiment is that, for milling tools having a positive axial rake angle, it is possible to avoid deepening the insert seat appreciably farthest from the front end surface, and in such a way increase the strength of the basic body further.

According to yet another embodiment, the shim plate is manufactured from cemented carbide, which has the advantage that the shim plate upon a possible insert breakdown can be used as a cutting edge in the period of time it takes to interrupt the machining.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

In the description, it is assumed, if nothing else is mentioned, that the cutting insert and the shim plate have been mounted to the basic body.

Figure 1:
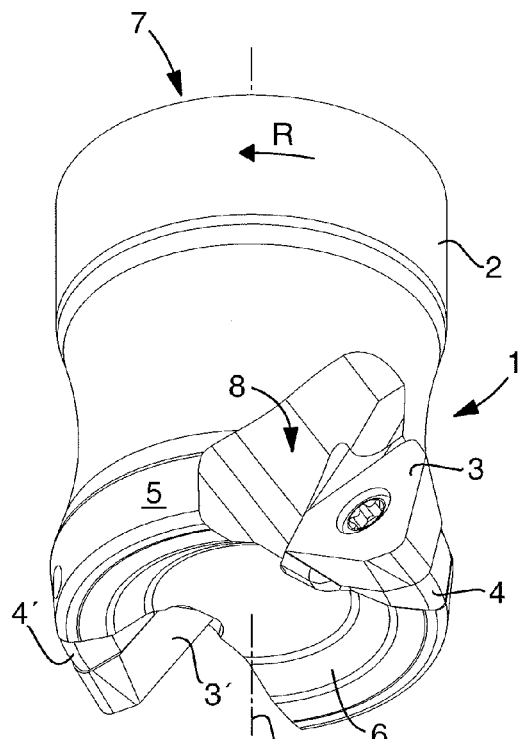
FIG. 1 is a perspective view of a milling tool with shim plates and cutting inserts mounted.
Figure 2:
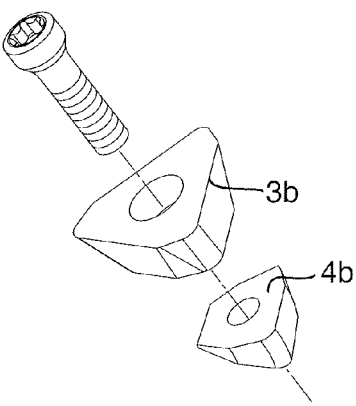
FIG. 2 is a detailed view of a shim plate and a cutting insert.
Figure 3:
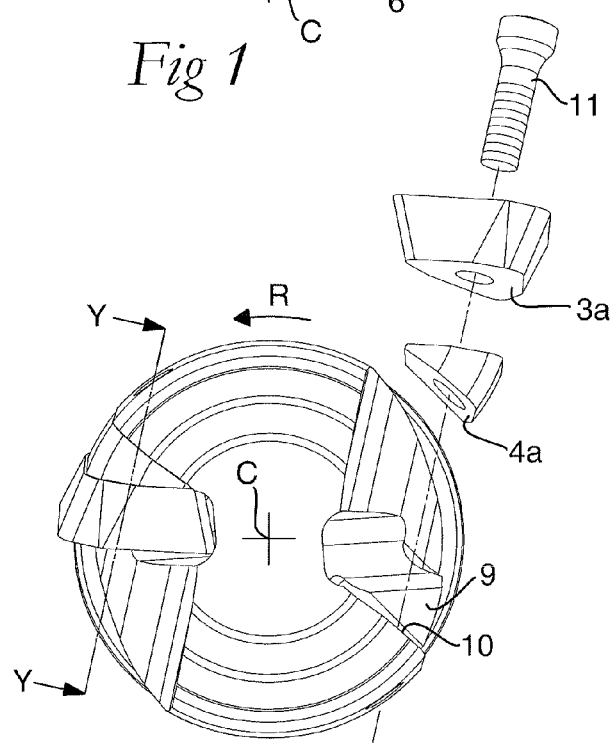
FIG. 3 is a planar view from the front end surface.
Figure 4:
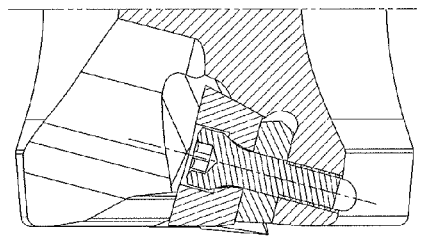
FIG. 4 is an axial cross-section along the marking Y in FIG. 3.

In FIGS. 1-9, a first embodiment of the invention is shown. FIG. 1 shows an assembled cutting tool (1). The cutting tool includes a basic body (2) and one or more cutting inserts (3) each one of which co-operates with a shim plate (4). The basic body is rotatable in the direction of rotation R around a center axis C, hereinafter called the rotational axis of the basic body or only the rotational axis. The basic body has also a peripheral envelope surface (5) that is concentric with the rotational axis and that often but not necessarily is rotationally symmetric, and a front (6) and a rear end surface (7). Further, the basic body includes a number of chip pockets (8), which form indentations in the envelope surface as well as in the front end surface. In the chip pockets, insert seats (9) are arranged. Each insert seat includes a seat surface (10) to which a shim plate and a cutting insert can be mounted. Each cutting insert includes, among other things, a bottom surface (3a) and a main cutting edge (3b). Of the surfaces of the cutting insert, the bottom surface (3a) abuts against the shim plate, while possible other support surfaces abut against the basic body as is shown in FIGS. 2-3.

Figure 7:
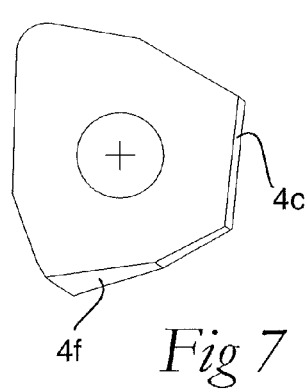
FIG. 7 is a perspective view of a shim plate.
Figure 8:
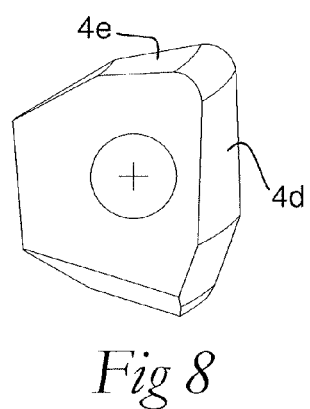
FIG. 8 is a perspective view of a shim plate.
Figure 9:
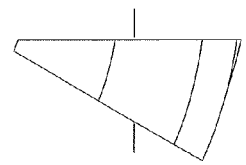
FIG. 9 is a shim plate as seen from the front end surface.

The shim plate (4) includes a bottom surface (4a) that in the mounted state is intended to adjoin to the seat surface (10) of the basic body and a contact surface (4b) that is intended to adjoin to the bottom surface (3a) of the cutting insert. This is shown in cross-section in FIG. 4. Between the bottom surface and the contact surface, at least one side surface extends. Depending on the cutting geometry, the side surfaces may vary in number. In the case the cutting insert and the shim plate are rectangular, there are at least four side surfaces, an inner (4c) and outer (4d) side surface of which, respectively, as seen in the radial direction from the rotational axis C of the basic body, as is shown in FIGS. 7-8. Accordingly, the outer side surface is located at the peripheral envelope surface (5) of the basic body and the inner one abuts against the basic body (2). Thereby, the inner side surface works as an extra support surface against the basic body. In this case, the shim plate includes in addition at least one front side surface (4e) situated at the front end surface of the basic body, as well as at least one rear side surface (4f) that constitutes a support surface, adjacent to the basic body in the axial direction. FIG. 9 shows the shim plate in planar view as seen from the front side surface. In the case the cutting insert and the shim plate are round, there is only one side surface that partly adjoins to the basic body. Naturally, the shim plate may also embrace other surfaces, for example chamfer surfaces situated between the previously mentioned surfaces.

Figure 5:
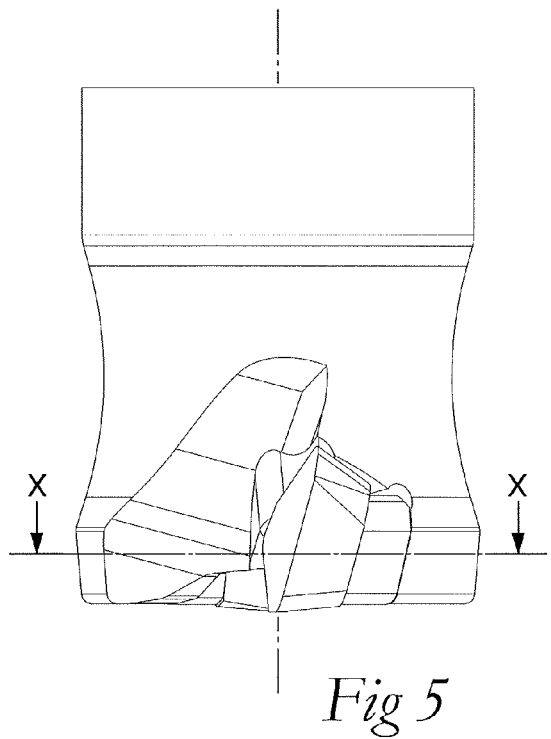
FIG. 5 is a side view of a milling tool.
Figure 6:
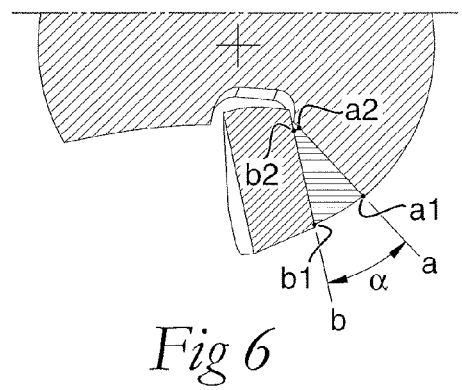
FIG. 6 is a radial cross-section along the marking X in FIG. 5.
Figure 10:
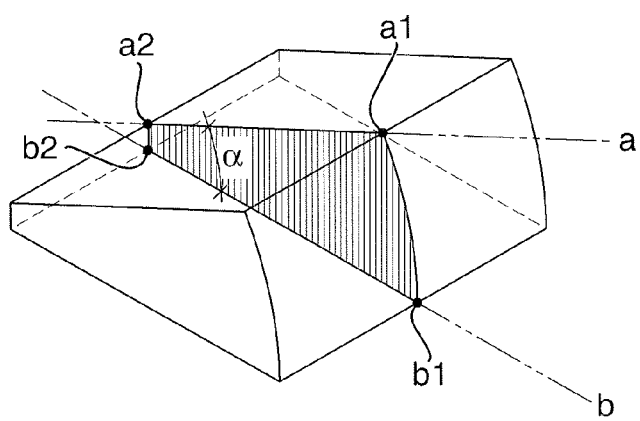
FIG. 10 is a schematic perspective view of a shim plate.

Characteristic of the shim plate (4) is that it is primarily wedge-shaped in the radial direction from the rotational axis C of the basic body. An arbitrary cross-section of the cutting tool, taken orthogonal to the rotational axis of the basic body and so that the cross-section includes the shim plate and the cutting insert (3) as shown simplified in FIGS. 5-6, is hereinafter designated the radial section (X). The bottom surface (4a) and contact surface (4b), respectively, of the shim plate may then, regardless of the detailed design of the surfaces, be represented by two straight lines in the radial section. One straight line (a), which represents the bottom surface of the shim plate, is then drawn so that it intersects the point (a1) of the bottom surface that is closest to the envelope surface (5) of the basic body and the point (a2) of the bottom surface that is closest to the rotational axis of the basic body. The other straight line (b), which represents the contact surface, is correspondingly drawn so that it intersects the point (b1) of the contact surface that is closest to the envelope surface and the point (b2) of the contact surface that is closest to the rotational axis of the basic body. These two lines diverge toward the envelope surface of the basic body, so that they form an angle α with each other. This is also illustrated schematically in FIG. 10.

In the first embodiment of the invention shown in FIGS. 1-9, the shim plate (4) has been adjusted to an end mill having triangular indexable cutting inserts (3) and a setting angle of 90°. In this embodiment, the basic body is twofold rotationally symmetric and hence includes two chip pockets (8), two cutting inserts and two shim plates. In this embodiment, the shim plate is mounted on the basic body (2), more precisely to the seat surface (10) of the basic body in the insert seat (9), together with the cutting insert by a screw (11) that extends through the contact surface (4b) and bottom surface (4a) of the shim plate. Here, the shim plate and the seat surface have been adjusted to a triangular indexable cutting insert, but may also be adapted to, for example, round, square, double-edged, or other cutting inserts.

The selection of the angle α by which the lines (a, b) representing the bottom surface (4a) and contact surface (4b), respectively, of the shim plate diverge depends on several factors, including the type of tool, the dimension and cutting geometry of the tool. The angle α should be sufficiently great for an essential increase of the strength of the basic body to be provided, at the same time as the protecting effect of the shim plate is maintained. If the angle α is sufficiently great, the shim plate may be made thin right in at the rotational axis C of the basic body, and in such a way, an increase of the strength of the basic body is provided. Simultaneously, the shim plate may be made sufficiently thick at the envelope surface (5) to be able to protect the basic body upon a possible insert breakdown. In order not to compromise the ability of the shim plate to be held in place during machining, however, the angle α should not be too great, since then there is a risk of the shim plate being pressed outward against the envelope surface. According to a preferred embodiment, the angle α is at least 5°. More preferably, the angle α is at least 10°. According to an additional preferred embodiment, the angle α is at most 30°. More preferably, the angle α is at most 25°.

The detailed design of the bottom surface (4a) and contact surface (4b) of the shim plate, as well as of the bottom surface (3a) of the cutting insert and the seat surface (10) of the basic body, can be varied considerably. The bottom surface and contact surface of the shim plate may, for example, be plane surfaces. This simple embodiment has the advantage that the manufacture will be cost-effective and is suitable particularly for small angles α where the retention of the shim plate in place during machining does not impose any problem. However, the bottom surface of the shim plate does not need to be plane, but may, for example, include a fastening member for attaching the shim plate in the basic body. The bottom surface may also be formed with elevated support points, for instance and preferably at least three in number, which abut against the seat surface of the basic body. Such an embodiment provides a very good stability.

According to a second embodiment, the bottom surface (4a) of the shim plate comprises coupling means that fixes the shim plate in its position in relation to the basic body (2). This second embodiment is particularly preferred when the angle α is relatively great, but coupling means may of course also be used at smaller angles. The coupling means may, for example, be accomplished by the bottom surface of the shim plate including a wave-shaped so-called serration surface or another connecting surface of the type that includes male members intended to engage female members in the adjacent seat surface (10) of the basic body. These two surfaces then hook into each other when the shim plate is fixed to the basic body and prevent the shim plate from changing position in relation to the basic body. Also the axial support surface (4f) of the shim plate against the basic body and the adjacent surface (P) on the basic body may include coupling means. The increased stability that then is achieved has, however, to be balanced against the fact that the manufacture of the basic body is made more complicated.

Neither does the contact surface (4b) of the shim plate facing the bottom surface (3a) of the cutting insert need to be plane, but may, for example, include coupling means for the cutting insert (3) to be fixed better in relation to the shim plate (4). According to a third embodiment of the invention, the contact surface of the shim plate facing the cutting insert has coupling means, which also in this case may be a serration surface or another connecting surface according to the above, where the bottom surface of the cutting insert adjacent to the shim plate co-operates with the contact surface of the shim plate. The bottom surface of the cutting insert is then provided with the corresponding coupling means.

Figure 11:
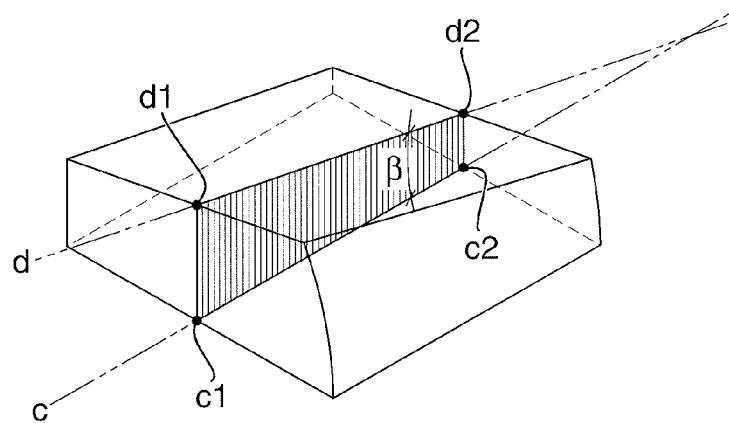
FIG. 11 is a schematic perspective view of a shim plate wedge-shaped in both the radial and the axial direction.
Figure 12:
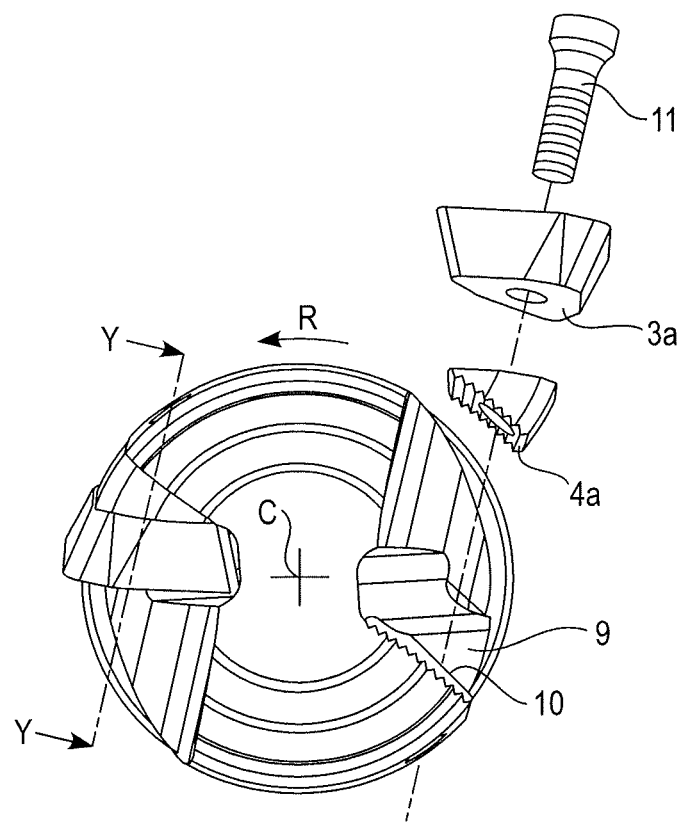
FIG. 12 is a planar view from the front end surface of another embodiment showing coupling means in the form of serrations on the bottom surface of the shim plate and the adjacent seat surface of the basic body.

According to an additional embodiment of the invention, schematically shown in FIG. 11, the shim plate (4) is wedge-shaped also in the axial direction, preferably in such a way that the thickness of the shim plate increases toward the front end surface (6). In this embodiment, an arbitrary cross-section that is orthogonal to the radial cross-section (X) may be made parallel to the rotational axis C of the basic body and parallel to the direction of rotation R so that it traverses the shim plate. Hereinafter, this cross-section is designated the axial cross-section (Y). An imaginary straight line (c) associated with the bottom surface (4a) of the shim plate can then be drawn so that it intersects the point (c1) of the axial cross-section where the bottom surface is closest to the front end surface (6) of the basic body and the point (c2) of the axial cross-section where the bottom surface is farthest from the front end surface of the basic body. An imaginary straight line (d) associated with the contact surface (4b) of the shim plate can be drawn so that it intersects the point (d1) of the axial cross-section where the contact surface is closest to the front end surface of the basic body and the point (d2) of the axial cross-section where the contact surface is farthest from the front end surface of the basic body. The shim plate according to this embodiment is characterized in that the two imaginary straight lines (c, d) diverge toward the front end surface of the basic body and form an angle β with each other. This embodiment is particularly suitable for milling tools having a positive axial rake angle since then it is possible to allow the inclination of the shim plate in the axial direction to be the same as the rake angle and in such a way avoid deepening the insert seat appreciably farthest from the front end surface.

The shim plate (4) can be fixed to the basic body (2) in several different ways. According to one embodiment of the invention, the cutting insert (3) and the shim plate can be fixed in the basic body by a common screw (11), such as is shown in the drawings. In another embodiment, the shim plate is attached to the basic body by a tubular screw having a threaded inside, in which the cutting insert then is attached by a separate screw. The cutting insert can then be replaced without the shim plate needing to be loosened.

The shim plate may, for example, be manufactured from sintered metal, high-strength steel or from cemented carbide. High-strength steel and sintered metal have the advantage to be hardenable by machining into the desired shape. These materials are also ductile. Cemented carbide has the advantage to be able to be manufactured in a powder metallurgical way into advanced shapes. They also provide a high strength when pressurized and may upon a possible insert breakdown be used as a cutting edge. According to a preferred embodiment, the shim plate is manufactured from cemented carbide.

The assembled cutting tool (1) includes, as mentioned above, a basic body (2), at least one shim plate (4) and at least one cutting insert (3). If a radial cross-section (X) is made orthogonal to the rotational axis C and traversing the shim plates and the cutting inserts, it is possible to draw two straight lines (s, r) associated with the seat surface (10) of the basic body and the contact surface (4b) of the shim plate facing the cutting insert, respectively. The straight line representing the seat surface of the basic body is drawn so that it intersects the point (a2) of the cross-section where the seat surface is closest to the rotational axis of the basic body and the point (a1) of the radial cross-section where the seat surface is closest to the envelope surface (5). The straight line representing the contact surface of the shim plate facing the cutting insert is drawn so that it intersects the point (b2) of the cross-section where the contact surface is closest to the rotational axis of the basic body and the point (b1) of the cross-section where the contact surface is closest to the envelope surface of the basic body. The cutting tool is characterized in that these two imaginary straight lines diverge toward the envelope surface and form the angle $\alpha$ with each other.

According to one embodiment of the invention, the cutting tool includes a shim plate (4) that is wedge-shaped also in the axial direction. If an axial cross-section (Y) is made parallel to the direction of rotation R and parallel to the rotational axis C of the basic body and traversing the shim plate (4), it is possible to draw two straight lines (c, d) associated with the shim plate's bottom surface (4a) and contact surface (4b) facing the cutting insert, respectively. The straight line (c) representing the bottom surface of the shim plate is drawn so that it intersects the point (c1) of the axial cross-section where the bottom surface is closest to the front end surface (6) of the basic body and the point (c2) of the cross-section where the bottom surface is farthest from the front end surface of the basic body. The straight line (d) representing the contact surface (4b) of the shim plate facing the cutting insert is drawn so that it intersects the point (d1) of the axial cross-section where the contact surface is closest to the front end surface of the basic body and the point (d2) of the axial cross-section where the contact surface is farthest from the front end surface of the basic body. According to this embodiment, the cutting tool is characterized in that these two imaginary straight lines diverge toward the front end surface and form an angle $\beta$ with each other. In this embodiment, the basic body becomes even stronger.

The interface between the seat surface (10) of the basic body and the bottom surface (4a) of the shim plate may, as described previously, be formed in various ways. According to one embodiment, the seat surface of the basic body and the bottom surface of the shim plate include coupling means. Also the interface between the contact surface (4b) of the shim plate and the bottom surface (3a) of the cutting insert may be formed in various ways. In addition to including a connecting surface in the form of, for example, a serration surface, the respective interfaces may include support points in the form of projections or some form of fastening members to attach the shim plate and the cutting insert to the basic body.

The assembled cutting tool (1) includes, as mentioned above, a basic body (2), at least one cutting insert (3) and at least one shim plate (4). The basic body is preferably manufactured from a metallic material, such as steel or aluminium. The cutting inserts may, for example, be manufactured from cemented carbide or from a ceramic material.

The described embodiments may be combined, so that for example a shim plate for a round cutting insert, just as well as a shim plate for a square or triangular cutting insert, may be wedge-shaped in both the radial and the axial direction and include one or more coupling means.

The assembled cutting tool is preferably a milling tool, such as an end mill, a face mill or a mill having round cutting inserts. The invention is particularly suitable for shank-end mills and for milling tools having a large number of cutting inserts, wherein conventional shim plates cannot be used because of the decreased strength of the basic body the same giving rise to. However, the cutting tool is not limited to milling tools, but may also be another cutting tool for rotary chip removing machining, such as a drilling tool.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A shim plate for mounting in a cutting tool for rotary chip removing machining, the shim plate comprising:
    a body including of a bottom surface, a contact surface, and one or more individual side surfaces extending between the bottom surface and the contact surface,
    wherein the bottom surface is adapted to adjoin to a seat surface of the cutting tool,
    wherein the contact surface is adapted to adjoin to a cutting insert, and
    wherein the bottom surface and contact surface of the shim plate form a wedge-shape in two perpendicular cross-sections,
    wherein, in a first cross-section traversing the shim plate, a first wedge shape is formed by a first imaginary straight line (a) associated with the bottom surface and extending from a first intersection point (a1) with the one or more individual side surfaces to a second intersection point (a2) with the one or more individual side surfaces, and a second imaginary straight line (b) associated with the contact surface and extending from a third intersection point (b1) with the one or more individual side surfaces to a fourth intersection point (b2) with the one or more individual side surfaces, and the first imaginary straight line (a) and the second imaginary straight line (b) form an angle $\alpha$ with each, wherein, in a second cross-section traversing the shim plate, a second wedge shape is formed by a third imaginary straight line (c) associated with the bottom surface and extending from a first intersection point (c1) with the one or more individual side surfaces to a second intersection point (c2) with the one or more individual side surfaces, and a fourth imaginary straight line (d) associated with the contact surface of and extending from a third intersection point (d1) with the one or more individual side surfaces to a fourth intersection point (d2) with the one or more individual side surfaces, and the third imaginary straight line (c) and the fourth imaginary straight line (d) form an angle β with each other.

2. The shim plate according to claim 1, wherein the angle α is 5-30°.

3. The shim plate according to claim 1, wherein the angle α is 10-25°.

4. The shim plate according to claim 1, wherein the bottom surface comprises coupling means for engaging the seat surface.

5. The shim plate according to claim 1, wherein the shim plate is manufactured from cemented carbide.

6. A cutting tool for rotary chip removing machining, comprising:
- a basic body including a rotational axis, a peripheral envelope surface concentric with the rotational axis, and at least one insert seat having a seat surface arranged therein, the cutting tool being rotatable in a direction of rotation,
- a shim plate detachably mounted to the seat surface of the insert seat, and
- a detachably mounted cutting insert adjacent to the shim plate in the insert seat,
- wherein the shim plate includes a bottom surface adjacent to the seat surface of the insert seat, a contact surface opposite to the bottom surface and adjacent to the cutting insert, and one or more individual side surfaces extending between the bottom surface and the contact surface,
- wherein the bottom surface and contact surface of the shim plate form a wedge-shape in two perpendicular cross-sections,
- wherein, in a first cross-section traversing the shim plate, a first wedge shape is formed by a first imaginary straight line (a) associated with the bottom surface of the shim plate and extending from a first intersection point (a1) with the one or more individual side surfaces to a second intersection point (a2) with the one or more side surfaces, and a second imaginary straight line (b) associated with the contact surface and extending from a third intersection point (b1) with the one or more individual side surfaces to a fourth intersection point (b2) with the one or more individual side surfaces, and the first imaginary straight line (a) and the second imaginary straight line (b) form an angle α with each other,
- wherein the second intersection point (a2) is the point on the first imaginary straight line (a) where the bottom surface is closest to the rotational axis and the fourth intersection point (b2) is the point on the second imaginary straight line (b) where the contact surface is closest to the rotational axis,
- wherein, in a second cross-section traversing the shim plate, a second wedge shape is formed by a third imaginary straight line (c) associated with the bottom surface and extending from a first intersection point (c1) with the one or more individual side surfaces to a second intersection point (c2) with the one or more individual side surfaces, and a fourth imaginary straight line (d) associated with the contact surface of and extending from a third intersection point (d1) with the one or more individual side surfaces to a fourth intersection point (d2) with the one or more individual side surfaces, and the third imaginary straight line (c) and the fourth imaginary straight line (d) form an angle β with each other, and
- wherein the second intersection point (c2) is the point on the third imaginary straight line (c) where the bottom surface is closest to the rotational axis and the fourth intersection point (d2) is the point on the fourth imaginary straight line (d) where the contact surface is closest to the rotational axis.

7. The cutting tool according to claim 6, wherein the bottom surface of the shim plate and the seat surface of the insert seat comprise coupling means.

8. The cutting tool according to claim 6, wherein the first intersection point (a1) is the point on the first imaginary straight line (a) where the bottom surface is closest to the envelope surface and wherein the third intersection point (b1) is the point on the second imaginary straight line (b) where the bottom surface is closest to the envelope surface.

9. The cutting tool according to claim 6, wherein a value of the angle a is different from a value of the angel β.

10. The cutting tool according to claim 6, wherein the shim plate is thicker at the envelope surface than closer to the rotational axis.

11. The cutting tool according to claim 6, wherein the basic body includes a mounting hole extending through the basic body from the bottom surface to the contact surface.

12. The cutting tool according to claim 6, wherein the first intersection point (a1) and the third intersection point (b1) are at a radial distance from the rotational axis that is the same as a radial distance of the envelope surface.

13. The cutting tool according to claim 6, wherein the side surface of the shim plate containing the first intersection point (a1) and the third intersection point (b1) are contained in the envelope surface.

14. The cutting tool according to claim 6, wherein a radially furthestmost point of the bottom surface is at the same radial distance from the rotational axis as the envelop surface.

15. The shim plate according to claim 1, wherein a value of the angle α is different from a value of the angel β.

16. The shim plate according to claim 1, wherein the basic body includes a mounting hole extending through the basic body from the bottom surface to the contact surface.

* * * * *